Patented Aug. 8, 1933

1,921,388

UNITED STATES PATENT OFFICE 1,921,388

PROCESS OF MAKING HYDROCHLORIC ACID

Sheldon B. Heath and Forest R. Minger, Midland, Mich., assignors to The Dow Chemical Company, Midland, Mich., a Corporation of Michigan No Drawing. Application September 20, 1929
Serial No. 394,133

10 Claims. (Cl. 23—156)

The present invention relates to the manufacture of hydrochloric acid, and has particular regard to processes involving reaction between chlorine, water vapor and carbon in accordance with the equation;

(1) $2Cl_2 + 2H_2O + C \rightarrow 4HCl + CO_2$

Numerous processes based upon the foregoing reaction have been proposed, one of the principal objects of which has been to utilize and control the large amount of heat, liberated in the reaction, amounting to approximately 68,000 calories.

For controlling the temperature of the reaction Rosenstein (U. S. Patent 1,485,816) has proposed to employ a large excess of water, while Hirschkind et al. (U. S. Patent 1,695,552) admit only the theoretical proportion of water but vary the depth of the carbon bed in the reaction zone, thereby regulating temperature by adjusting the relative mass of reaction carbon to the volume of steam and chlorine employed. A disadvantage of the first method is that the large excess of water condensed out with the reaction product yields a dilute acid solution, and furthermore some of the excess of steam reacts with the glowing carbon to form hydrogen and carbon monoxide, according to the well-known water gas reaction;

(2) $H_2O + C \rightarrow H_2 + CO$ whereby danger of forming inflammable and explosive gas mixtures arises. The second method referred to is difficult to control and is not adapted to maintaining uniform operating conditions, while the product may contain appreciable amounts of carbon monoxide and hydrogen. The various processes heretofore employed are operated at relatively high temperature, i. e. from about 750° to as high as 900° C., whereat the carbon employed in the reaction is heated to incandescence. At such high temperatures carbon is rapidly oxidized by air to CO and $CO_2$, so that processes of the type just mentioned necessarily are adapted only to the use of a strong chlorine gas if excessive consumption of carbon is to be avoided. The temperatures prevailing in the aforesaid processes, furthermore, are distinctly favorable to the reaction (3) $CO_2 + C \rightarrow 2CO$ in the presence of a mass of glowing carbon, thus affording another possibility of producing considerable amounts of carbon monoxide.

We have now found that a process in accordance with equation (1) can be carried out at much lower temperatures than have been heretofore employed, in fact at temperatures materially below those at which equations (2) or (3) will take place spontaneously, and below the ignition temperatures of carbon in air. In order to prevent an excessive rise of temperature due to the heat evolved by the reaction, we have found that a satisfactory control of temperature is secured by admixing air directly with the chlorine, or by employing a weak or dilute chlorine gas, such as is obtained as a by-product of various industrial processes, the usual diluent being air. The air acts simply as a diluting and cooling medium and does not enter materially into the reaction at the temperatures maintained therefor. A further advantage of our improved process is that the acid gas is formed at a temperature above the boiling point of water, but below that at which dry hydrochloric acid gas actively attacks iron directly, hence the process may be carried out in iron apparatus without excessive depreciation or deterioration thereof due to corrosion or the effects of high temperature.

To the accomplishment of the foregoing and related ends the invention, then, consists in the steps hereinafter fully described and particularly pointed out in the claims, the following description setting forth in detail certain modes of procedure for carrying out the invention, such procedures illustrating, however, but a few of the various ways in which the principle of the invention may be used.

At the temperatures employed our improved process involves the direct formation of hydrochloric acid and carbon dioxide from the reacting materials substantially without the accompanying formation of the combustible gases hydrogen and carbon monoxide. The operating temperatures are broadly comprised within the range 100° to 400° C. In practice, the preferred temperature will depend somewhat upon the type of carbon employed. For example, with wood charcoal of proper degree of fineness, we have found temperatures in the neighborhood of 250° C. to give practically 100 per cent conversion to hydrochloric acid, while with coke somewhat higher temperatures, around 325° to 375° C., are necessary for complete reaction.

It is known that direct oxidation of carbon in air does not take place to any great extent below about 400° C., unless special catalysts are present, while reaction between carbon and water vapor, as in equation (2), begins only at about 600° C. and reduction of carbon dioxide by carbon, as in equation (3), requires a temperature of at least 450° to 550° C. Consequently, in contradistinction to the other processes referred to, our improved process is carried out at temperatures below those at which any of the secondary reactions just mentioned will take place of themselves.

The strongly exothermic character of the reaction in the present process necessitates the employment of a relatively large volume of diluting gases in order to absorb the heat liberated and maintain the temperature within the prescribed limits. We have found that an adequate temperature control is most conveniently maintained when the proportion of chlorine to air or other diluting gas employed is between 1 and 4 parts per hundred by volume. With such mixtures the reaction temperature may be readily controlled within the desired limits. When a stronger chlorine-air mixture is employed, it is preferable to withdraw and cool a portion of the exit gases from the reaction and then mix them with the fresh gases entering the reaction in such proportion that the resultant gaseous mixture will have a chlorine content between 1 and 4 per cent. Such recycling of exit gases may be made continuous, the volume of recycled gases being controlled automatically by suitable means regulated by the reaction temperature. Other methods for controlling temperature may be employed, if desired, such as by admitting a sufficient additional volume of air or other inert gas, such as nitrogen, methane, etc., to dilute the reaction mixture to a content of from 1 to 4 per cent chlorine, in case a stronger chlorine gas is initially employed. Again, a greater proportion of chlorine to diluent gas may be maintained in the reaction zone and artificial cooling means employed to control the temperature.

Furthermore, the amount of water vapor introduced to the reaction may be varied at will. For instance, just sufficient water vapor may be admitted to satisfy the equation (1), or an excess thereof may be employed such that the hydrochloric acid product may be condensed directly as an aqueous solution of any desired strength.

We have found that the temperature to be maintained in the reaction zone varies with the nature of the carbon employed, various forms of charcoal being reactive at a lower temperature than denser forms of carbon, such as coke. The fineness of the carbon is also a material factor. When wood charcoal is employed, with a fineness of about 6 to 10 mesh, a substantially 100 per cent conversion of chlorine to hydrochloric acid is obtained at a temperature of 240° to 250° C. with a rate of gas flow such that the gases are in contact with the charcoal for about 15 to 20 seconds. With coarser charcoal the rate of reaction is slower, while with finer charcoal the rate tends to increase so as to interfere with easy control of temperature. Temperature likewise affects the rate of reaction so that a proper balance between gas flow and temperature must be preserved. At temperatures as low as 100° C. some reaction takes place but the rate is excessively slow, while at temperatures materially above 250° C. the higher reaction rate makes the control of temperature more difficult.

It is important for the purposes of the present process that the charcoal employed be substantially free from easily oxidizable volatile impurities, otherwise the ignition temperature of the charcoal may be lowered thereby to an extent such as to interfere with the regular course of the reaction. With the usual commercial forms of charcoal, therefore, we have found it advisable to subject the material to a preliminary treatment before employing the same in the process. Such treatment consists in heat-treating the charcoal, as by roasting in a muffle furnace, at a temperature of about 900° C. for several hours, whereby the volatile constituents thereof are completely driven off.

When coke instead of charcoal is employed as the carbon material, a higher reaction temperature is necessary for complete conversion of chlorine to hydrochloric acid, other factors being equal. For instant, using coke of 6 to 10 mesh size and maintaining period of contact of gases and coke of about 20 seconds, a temperature of between 325° and 350° C. is required for a 100 per cent conversion of chlorine to hydrochloric acid. With a sufficiently reduced rate of flow, however, the reaction with coke may be conducted at temperatures as low as 250° to 260° C. Conversely, at higher temperatures a higher rate of gas flow may be employed.

In either case just described the optimum reaction temperature is well below the point of incandescence of the carbon and also below the temperature at which material reduction of carbon dioxide to carbon monoxide takes place. Hence, under properly controlled operating conditions, the exit gases will be substantially free from carbon monoxide. We have found that the temperature limit, above which the carbon begins to glow, is about 300° C. for charcoal and about 425° C. for coke. Operation above such temperature limits with the respective forms of carbon will result in formation of carbon monoxide in amount increasing with the further rise of temperature.

The following detailed examples of our improved process are given for the purpose of illustration, but it is understood that the invention is not limited to the specific conditions set forth therein.

*Example 1*

An air-chlorine mixture, containing 2 per cent chlorine, was preheated to a temperature of about 160° C. and admixed with sufficient water vapor for complete reaction with the chlorine present in accordance with equation (1). The mixed gases were passed through a bed of charcoal maintained at a temperature between 240° and 260° C. at a rate of flow such that the time of contact of gases and charcoal was about 18 seconds. The hydrochloric acid was recovered from the exit gases by absorption in water. A 99.2 per cent conversion of chlorine to hydrochloric acid was obtained, based upon analysis of the effluent gas, while the percentage of carbon monoxide was only 0.0008 to 0.0015 per cent.

*Example 2*

An air-chlorine mixture, containing 2 per cent chlorine, was preheated to 160° C. and after mixing with a slight excess over the theoretical proportion of water vapor, was passed through a bed of coke of 6 to 10 mesh size at approximately the same rate of flow as in the previous example, the temperature of the bed being maintained at approximately 350° C. A 100 per cent conversion of chlorine to hydrochloric acid was obtained, and no carbon monoxide was found in the exit gases.

Example 3

A mixture of air and chlorine, containing 6.6 per cent chlorine by volume, was mixed with an excess of water vapor sufficient to produce a 43 per cent aqueous HCl solution, and the mixed gases passed through a charcoal bed at a temperature between 180° and 190° C. The reaction gases were condensed in a water-cooled condenser maintained at a temperature of 22° C., from which a 29.3 per cent hydrochloric acid solution was separated containing 72 per cent of the hydrochloric acid formed, the balance of the acid being recovered by absorbing the exit gases from the condenser in water in a scrubber tower. The combined yield of hydrochloric acid was 99.4 per cent of the total chlorine in the exit gases from the reaction. No carbon monoxide was found in the exit gases.

In the foregoing examples the entering mixture of gases and vapors was preheated to the stated temperature by passing through a steam-jacketed tube. The retort employed for the reaction consisted of a jacketed iron tube. Steam was initially supplied to the jacket for warming up the body of carbon to the desired temperature. Thereafter the reaction heat developed was sufficient to maintain the temperature. When, however, the temperature tended to rise above the limits given, cooling of the reaction mass was effected by passing cold air through the jacket. In extreme cases, where the temperature is in danger of rising so high as to get out of control by causing reaction between carbon and oxygen in the mixture, stronger cooling of the retort may be effected by passing cold water through the jacket.

When it is desired to employ a strong chlorine gas in the present process, such strong gas must be diluted with a non-reactive gas so that the chlorine content of the diluted mixture is preferably between 1 and 4 per cent. Instead of employing air or other inert gas for the purpose, we may utilize hydrochloric acid gas, whereby a particular advantage is secured in that absorption of the gaseous reaction product is most easily effected and may be carried out in a smaller apparatus than when another diluent gas is used.

Among the advantages afforded by our improved process, wherein it distinguishes from all previous processes of related character, are: (1) control of reaction temperature by admixing air or other inert gas with the reaction gases; (2) maintenance of reaction temperature below the point where direct combination of carbon and oxygen occurs, or where the water gas reaction of steam on hot carbon can take place, whereby excessive consumption of carbon and the formation of explosive gas mixtures containing carbon monoxide and hydrogen are avoided; (3) utilization of weak or dilute chlorine gas instead of a rich gas; (4) dilution of gaseous reaction mixture, if necessary, by recycling a portion of the exit gases of reaction in order to maintain the desired proportion of chlorine in the mixture and thus to regulate the heat of reaction developed.

In the claims, the term "carbon" denotes the usual commercial forms of carbon such as wood charcoal produced by the destructive distillation of wood, or commercial coke produced by any of the well known coking processes for carbonizing coal.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:—

1. A process for the manufacture of hydrochloric acid which comprises reacting an air-chlorine mixture containing approximately from 1 to 4 per cent chlorine by volume, water vapor and carbon in divided form at a temperature between 100° and 400° C.

2. A process for the manufacture of hydrochloric acid which comprises contacting an air-chlorine mixture, containing approximately from 1 to 4 per cent chlorine by volume, and water vapor in approximately the proportions corresponding to the equation:

$$2Cl_2 + 2H_2O + C \rightarrow 4HCl + CO_2$$

with finely divided carbon and maintaining the temperature within the reaction zone between 100° and 400° C.

3. A process for the manufacture of hydrochloric acid which comprises reacting chlorine, water vapor and carbon in the presence of a relatively large volume of a non-reactive gaseous diluent at a temperature between 100° and 400° C., and maintaining the proportion of chlorine by volume in said reaction gases between approximately 1 and 4 per cent by returning thereto a portion of the exit gases from the reaction.

4. A process for the manufacture of hydrochloric acid which comprises adding water vapor to an air-chlorine mixture containing approximately 1 to 4 per cent chlorine by volume, the proportion of water vapor relative to that of chlorine being approximately in accordance with the equation;

$$2Cl_2 + 2H_2O + C \rightarrow 4HCl + CO_2,$$

intimately contacting the mixed gases and vapors with a body of wood charcoal in divided form to cause reaction therewith, while maintaining the reaction mass at a temperature materially above 100° C. but not greatly exceeding 250° C., and separating hydrochloric acid from the reacted gaseous mixture.

5. A process for the manufacture of hydrochloric acid which comprises contacting water vapor and an air-chlorine mixture containing a relatively small proportion of chlorine with a body of carbon in subdivided form at a temperature between about 100° and 400° C. and separating hydrochloric acid from the reacted gaseous mixture.

6. A process for the manufacture of hydrochloric acid which comprises contacting water vapor and an air-chlorine mixture containing a relatively small proportion of chlorine with a body of carbon in subdivided form at a temperature between about 100° and 400° C., such water vapor being not greatly in excess of an equimolecular proportion to the chlorine, and separating hydrochloric acid from the reacted gaseous mixture.

7. A process for the manufacture of hydrochloric acid which comprises diluting an air-chlorine mixture containing in excess of about 4 per cent of chlorine by volume with a sufficient volume of a non-reactive gas to produce a mixture containing between 1 and 4 per cent of chlorine, contacting such gas mixture with a body of carbon in subdivided form at a temperature between about 100° and 400° C. and in the presence of water vapor in amount at least to correspond to the equation $$2Cl_2 + 2H_2O + C \rightarrow 4HCl + CO_2$$

and separating hydrochloric acid from the reacted gaseous mixture.

8. A process for the manufacture of hydrochloric acid which comprises diluting an air-chlorine mixture containing in excess of about 4 per cent of chlorine by volume with a sufficient volume of a non-reactive gas to produce a mixture containing between 1 and 4 per cent of chlorine, contacting such gas mixture with a body of carbon in subdivided form at a temperature between about 100° and 400° C. and in the presence of water vapor in amount at least to correspond to the equation $$2Cl_2 + 2H_2O + C \rightarrow 4HCl + CO_2,$$

returning a portion of the exit gases of the reaction to the first step for the diluent gas therein and separating hydrochloric acid from the remainder of such exit gases.

9. A process for the manufacture of hydrochloric acid which comprises reacting a mixture of chlorine and inert diluent gases, containing a relatively small amount of chlorine, with water vapor and carbon in subdivided form at a temperature between about 100° and 400° C.

10. A process for the manufacture of hydrochloric acid which comprises reacting a mixture of chlorine and inert diluent gases, containing approximately 1 to 4 per cent of chlorine, with water vapor and carbon in subdivided form at a temperature between about 100° and 400° C.

SHELDON B. HEATH.
FOREST R. MINGER.